United States Patent
Shreiner

(10) Patent No.: US 9,922,442 B2
(45) Date of Patent: Mar. 20, 2018

(54) GRAPHICS PROCESSING UNIT AND METHOD FOR PERFORMING TESSELLATION OPERATIONS

(75) Inventor: David Robert Shreiner, San Jose, CA (US)

(73) Assignee: ARM Limited, Cambridge (GB)

( * ) Notice: Subject to any disclaimer, the term of this patent is extended or adjusted under 35 U.S.C. 154(b) by 499 days.

(21) Appl. No.: 13/552,090

(22) Filed: Jul. 18, 2012

(65) Prior Publication Data

US 2014/0022264 A1    Jan. 23, 2014

(51) Int. Cl.
*G06T 17/20* (2006.01)
*G06T 15/00* (2011.01)

(52) U.S. Cl.
CPC ........... *G06T 15/005* (2013.01); *G06T 17/20* (2013.01)

(58) Field of Classification Search
CPC .... G06T 15/005; G06T 17/20; G06T 2210/52
USPC .................................... 345/423, 520
See application file for complete search history.

(56) References Cited

U.S. PATENT DOCUMENTS

| | | |
|---|---|---|
| 7,142,206 B1 * | 11/2006 | Moreton ............... 345/419 |
| 8,174,531 B1 | 5/2012 | Lindholm et al. |
| 8,599,202 B1 * | 12/2013 | Legakis et al. ............... 345/423 |
| 2010/0053158 A1 * | 3/2010 | Goel ............................. 345/423 |
| 2011/0080404 A1 * | 4/2011 | Rhoades et al. ............. 345/423 |
| 2011/0128285 A1 * | 6/2011 | Gong ............................ 345/423 |
| 2011/0267346 A1 * | 11/2011 | Howson ........................ 345/423 |

OTHER PUBLICATIONS

M. Schwarts et al., Fast GPU-Based Adaptive Tessellation with CUDA, University of Erlangen-Nuremberg, Eurographics 2009, vol. 28, No. 2, 10 pages.
UK Search Report dated Dec. 2, 2013 in GB 1310012.8, 3 pages.

* cited by examiner

*Primary Examiner* — Weiming He
(74) *Attorney, Agent, or Firm* — Nixon & Vanderhye P.C.

(57) ABSTRACT

A graphics processing unit having a shader execution unit for executing a plurality of shader routines in order to perform a predetermined sequence of shader operations. The shader operations include a tessellation operation which receives as inputs tessellation control data and an input list of input data for M input vertices, and generates at least output data for P output vertices. For each output vertex, the controller allocates a tessellation shader routine from the set of shader routines, and the shader execution unit is configured, each time the tessellation shader routine is executed for an associated output vertex: (i) to compute, in dependence on the tessellation control data and the associated output vertex, tessellation coordinate data; and (ii) to compute from the input data for the M input vertices, and the tessellation coordinate data generated in step (i), the output data for the associated output vertex.

20 Claims, 9 Drawing Sheets

SHADER EXECUTION FLOW

GRAPHICS PROCESSING UNIT AND METHOD FOR PERFORMING TESSELLATION OPERATIONS

BACKGROUND OF THE INVENTION

Field of the Invention

The present invention relates to a graphics processing unit, and a method of operation of such a graphics processing unit, and in particular to techniques for performing tessellation within such a graphics processing unit.

Description of the Prior Art

When seeking to render complex shapes (such as higher-order smooth surfaces) in order to produce a graphics image for display, those complex shapes typically first need to be converted into meshes of standard rendering primitives, an example of such a standard rendering primitive being a triangle. The desired graphics image can then be generated from the resultant mesh data. The process of converting such complex shapes into meshes of standard rendering primitives is referred to as tessellation.

In older graphics processing systems, tessellation was often implemented as a pre-processing step by software executing on a central processing unit (CPU), with the resultant mesh data then being provided directly as an input to a graphics processing unit (GPU). However, in modern graphics processing systems, tessellation is typically performed within the GPU, to enable the computational power of the GPU to be effectively utilised, and to avoid having to transfer large amounts of geometry data to the GPU every frame. In addition, such an approach allows for adaptive tessellation techniques to be performed, where the granularity of the mesh is adapted dependent on the situation, for example the resolution required, the viewing angle, etc.

The article "Fast GPU-based Adaptive Tessellation with CUDA" by M Schwarz et al, Eurographics 2009, Volume 28, Number 2, describes a framework for on-the-fly adaptive tessellation utilising CUDA, CUDA being a non-graphics application programming interface (API) that mainly targets compute-intense data-parallel applications. In accordance with the described technique, all surface primitive instances in the scene are adaptively tessellated in parallel and the resulting triangle meshes are output into vertex and index buffers for rendering. However, one inherent problem with the described technique is that it is not compatible with modern graphics API standards.

In particular, modern versions of popular graphics APIs (such as Microsoft's DirectX 11, or OpenGL 4.X) describe a number of discrete shader operations to be performed by associated shader routines in order to convert the vertex data originally provided by the graphics application into the mesh data to be used by subsequent rendering elements such as a rasteriser in order to produce the final graphics image for display. In accordance with such graphics APIs, the tessellation phase is composed of two programmable shader stages along with a fixed-function tessellator block, as shown schematically in FIG. 1.

The Hull shader stage 15 (using DirectX terminology, but also referred to as the Tessellation Control shader stage in OpenGL terminology) and the Domain shader stage 25 (using DirectX terminology, but also referred to as the Tessellation Evaluation shader stage in OpenGL terminology) are implemented by corresponding shader routines executed by a shader execution unit of the GPU, but defined by the graphics application, whilst typically the fixed-function tessellator 20 is implemented using a hardware block. The vertex data 10 is an ordered list of vertices (which contains, at a minimum, positional data, but may contain many other per-vertex data values) and, as will be understood by those skilled in the art, is typically produced as an output from a vertex shader operation used to perform one or more transformation operations on the originally provided vertex data from the graphics application.

The Hull shader stage 15 specifies a list of vertices (which may or may not be different to the set of vertices in the vertex data 10) to be provided as an input to the Domain shader stage 25, and hence which will be referred to hereafter as "an input list of input vertices". For each input vertex that the Hull shader stage is to generate, the Hull shader routine is executed once. The Hull shader stage also produces tessellation values that are passed to the fixed-function tessellator 20, and which define the number of mesh vertices to generate. The fixed-function tessellator 20 then generates a series of mesh vertices, and for each mesh vertex that is output from the fixed-function tessellator, a domain shader routine is executed by the Domain shader stage 25, the Domain shader stage performing operations on each mesh vertex output by the tessellator 20, in much the same way as a vertex shader. Hence, the Domain shader stage may potentially transform the vertex's data, with the results then being written out as the mesh vertex data 30 for use in downstream processing.

In addition to generating each mesh vertex input to the Domain shader stage 25, the fixed-function tessellator 20 also generates mesh topology data 35, which is also stored for use in downstream processing.

The fixed-function tessellator block 20 can potentially generate a significant amount of data, and hence through the use of the dedicated hardware block there is the potential for performance to be improved. However, a significant disadvantage is that that hardware block becomes a synchronisation point, creating a pipeline dependency within the shader execution unit. In particular, this pipeline dependency can significantly impact the performance of the Domain shader stage within the shader unit, since the domain shading operation cannot begin until the fixed-function tessellator has generated the required outputs.

Accordingly, it would be desirable to provide an improved technique for performing tessellation within a graphics processing unit, whilst maintaining compatibility with modern graphics APIs.

SUMMARY OF THE INVENTION

Viewed from a first aspect, the present invention provides a graphics processing unit comprising: a shader execution unit configured to execute a plurality of shader routines in order to perform a predetermined sequence of shader operations; a rendering unit configured to perform at least one rendering operation on data output by the shader execution unit; a controller configured to allocate to the shader execution unit individual shader routines from a set of shader routines, in order to cause the predetermined sequence of shader operations to be performed; the predetermined sequence of shader operations including a tessellation operation, the tessellation operation receiving as inputs tessellation control data and an input list of input data for M input vertices, and generating at least output data for P output vertices; the controller being configured to allocate to the shader execution unit, for each output vertex of the P output vertices, a tessellation shader routine from said set of shader routines; the shader execution unit being configured, each time the tessellation shader routine is executed for an associated output vertex: (i) to compute, in dependence on the tessellation control data and the associated output vertex, tessellation coordinate data; and (ii) to compute from the input data for the M input vertices, and the tessellation coordinate data generated in step (i), the output data for the associated output vertex.

In accordance with the present invention, the pipeline dependency arising within the system of FIG. 1, due to the fixed-function tessellator becoming a synchronisation point, is removed, providing significantly enhanced flexibility as to how the various shader routines are allocated to the shader execution unit via the controller. Furthermore, the technique of the present invention can lead to reduced bandwidth requirements in relation to accesses to shared memory, since there is no need to write the tessellation coordinate data to memory prior to it being retrieved and utilised by the Domain shader function. Instead, the tessellation coordinate data is generated on the fly as the tessellation shader routine executes, with that tessellation coordinate data then being consumed by the tessellation shader routine during the above mentioned step (ii) that generates the output data for the associated output vertex.

In one embodiment, the tessellation operation is configured to generate as outputs an output list of the output data for the P output vertices, and an index list having R index entries containing index data used to control how the output data for each of the P output vertices is subsequently used by the rendering unit. The shader execution unit is then configured, each time the tessellation shader routine is executed for an associated output vertex, in addition to said step (i) and (ii): (iii) to generate, in dependence on the associated output vertex, index data used to populate the R index entries of said index list.

In such embodiments, the shader execution unit is arranged for each output vertex to be generated by the tessellation operation, to perform a sequence of steps that results not only in the output data for the associated output vertex being generated, but also, in dependence on that associated output vertex, to cause index data to be generated that is used to populate the R index entries of the index list. The output data for each output vertex contains, at a minimum, positional data, but may contain many other per-vertex data values. By such an approach, it is possible to fully incorporate the functionality of the fixed-function tessellator discussed earlier with reference to FIG. 1 within the shader functionality normally associated with a Domain shader stage or the like, with the resultant tessellation shader routine of the present invention performing both functions.

Whilst the shader execution unit may in one embodiment have a single shader execution resource, such that each shader routine needs to be scheduled serially to the shader execution unit by the controller, in one embodiment the shader execution unit has a plurality of shader execution resources, each shader execution resource configured to execute an allocated shader routine. In one embodiment, the multiple shader execution resources may take the form of separate shader engines provided within the GPU, or alternatively may take the form of separate shader execution threads provided by the shader execution unit.

In embodiments where the shader execution unit has a plurality of shader execution resources, the controller may be configured to allocate the tessellation shader routine to multiple of those shader execution resources to cause the tessellation operation for multiple output vertices of the P output vertices to be performed at least partially in parallel. Hence, in accordance with such embodiments, the tessellation shader routine can be scheduled in parallel across multiple engines/threads, and due to the removal of the requirement for the fixed-function tessellator of FIG. 1, each tessellation shader routine can be scheduled as soon as the tessellation control data is available. Hence, such an approach provides a significantly improved flexibility with regard to the scheduling of the tessellation shader routine.

The tessellation control data can take a variety of forms. However, in one embodiment, the tessellation control data identifies the number P of output vertices, and the number R of index entries in said index list.

In one embodiment, the predetermined sequence of shader operations includes a tessellation setup operation, the tessellation setup operation receiving as an input an initial list of initial data for N initial vertices, and generating as outputs said input list and said tessellation control data for input to the tessellation operation. The controller is configured to allocate to the shader execution unit, for each input vertex of the M input vertices, a tessellation setup shader routine from said set of shader routines. The shader execution unit is configured, each time the tessellation setup shader routine is executed for an associated input vertex: (a) to compute, from the initial data of the N initial vertices, the input data for the associated input vertex; and (b) to generate data used to form said tessellation control data.

In one particular embodiment, the tessellation setup shader routine is a Hull or Control shader as specified by the DirectX and OpenGL standards. After the tessellation setup shader routine has been executed for each input vertex, the tessellation control data required for the tessellation operation will be available.

In one embodiment, as mentioned earlier, the tessellation control data identifies the number P of output vertices, and the number R of index entries in the index list. In one particular embodiment, the controller is responsive to completion of the tessellation setup operation to issue a notification to a memory allocation means to cause memory space to be allocated for storage of the output list and the index list to be generated by the tessellation operation. Hence, by such an approach, the required memory space is allocated prior to execution of the tessellation operation that will generate the output list and the index list.

The memory allocation means can be implemented in a variety of ways. However, in one embodiment the memory allocation means is provided by a graphics driver within an additional processing unit with which the graphics processing unit is coupled, and the memory space resides in shared memory accessible by both the graphics processing unit and the additional processing unit. Hence, in such embodiments, on completion of the tessellation setup operation, the controller within the GPU will contact the graphics driver to cause the graphics driver to allocate the required memory space in shared memory for the output list and index list to be produced by the tessellation operation.

There are a number of ways in which the tessellation shader routine used in embodiments can be generated. In one particular embodiment, the setup shader routines are generated by a shader compiler provided by a graphics driver within an additional processing unit with which the graphics processing unit is coupled, the shader compiler modifying original tessellation code specified by an application executing on the additional processing unit in order to supplement the tessellation shader routine generated for that original tessellation code with functions to perform said steps (i) and (iii) in addition to said step (ii) specified by the original tessellation code. Accordingly, in one specific example, the original tessellation code specified by the application may be original Domain shader code used to implement the Domain shader functionality, and the shader compiler modifies the compilation process in order to produce an enhanced Domain shader routine that not only performs the standard Domain shading function but also performs said steps (i) and (iii), thereby removing the requirement for the fixed function tessellator to be used.

As mentioned earlier, each time the tessellation shader routine is executed for an associated output vertex, it generates, in dependence on the associated output vertex, index data used to populate the R index entries of the index list. Dependent on the associated output vertex in question, this may mean that either no items of index data are generated, one item is generated, or multiple items of index data are generated for a particular execution of the tessellation shader routine. However, by the time execution of the tessellation shader routine for every output vertex of the output list has been completed, each index entry in the index list will be populated with associated index data, the populated index list providing an index entry for each primitive that is incident with each of the P output vertices.

When using the tessellation shader routine of the above described embodiments, it has been found that under certain situations a further optimization can be realised. In particular, in an operating condition where the tessellation control data is not dependent on the input data of the input list, the shader execution unit is configured, each time the tessellation shader routine is allocated by the controller, to perform an initial step, prior to step (i), of performing a vertex transformation operation on an initial list of initial data for N initial vertices to generate at least a portion of said input list of input data for said M input vertices. Hence, under such circumstances, the operations normally associated with a Hull or Control shader can be incorporated within the functionality of the tessellation shader routine, thereby avoiding the need for a separate Hull or Control shader routine. Whilst such an approach may cause repetition of the Hull shader operation (in particular the Hull shader operation being repeated each time the tessellation shader routine is performed), it significantly reduces the bandwidth required for access to shared memory, since the results that would normally be generated by a Hull or Control shader no longer need to be stored to the shared memory, since they are consumed directly by the tessellation shader routine. Furthermore, the controller only needs to schedule a single shader routine to the shader execution unit rather than two separate routines. In addition, the functions performed by the Hull shader operation are often relatively minor, and hence the overhead of repeating the Hull shader operation each time the tessellation shader routine is performed is outweighed by the benefits arising from this approach. In addition, whilst in one such embodiment the full set of M input vertices are re-generated each time the tessellation shader routine is performed, in alternative embodiments only the subset of the M input vertices required for the tessellation shader routine's computation of the output data for the associated output vertex need be computed in any particular instance.

In embodiments where the set of shader routines are generated by a shader compiler provided by a graphics driver within an additional processing unit with which the graphics processing unit is coupled, the shader compiler can be arranged to be responsive to the detection of the above-mentioned operating condition to combine original tessellation setup code and original tessellation code specified by an application executing on the additional processing unit in order to generate the tessellation shader routine. In the same way as discussed earlier, the shader compiler may be further configured to supplement the tessellation shader routine with functions to perform said steps (i) and (iii) in addition to said step (ii) specified by the original tessellation code. As a result, when the above-mentioned operating condition is detected, the functions typically associated with the Hull or Tessellation Control shader stage, fixed-function tessellator, and Domain or Tessellation Evaluation shader stage shown in FIG. 1 can all be subsumed into a single tessellation shader routine.

In embodiments where the tessellation control data is not dependent on the input data of the input list, and accordingly the above-mentioned optimisation is used, the graphics driver may be configured to determine the tessellation control data and to allocate, in dependence on the determined tessellation control data, memory space for storage of the output list and the index list to be generated by the tessellation operation. Accordingly, such an approach allows the driver to pre-allocate the memory for storing the results, potentially as early as shader compilation time.

Viewed from a second aspect, the present invention provides a data processing apparatus comprising a graphics driver for executing a shader compiler to generate a set of shader routines for execution by a graphics processing unit in accordance with the first aspect of the present invention, the shader compiler being configured to modify original tessellation code specified by an application executing on the data processing apparatus in order to supplement the tessellation shader routine generated for that original tessellation code to include functions to perform said steps (i) and (iii) in addition to said step (ii) specified by the original tessellation code.

In one particular embodiment, the shader compiler is responsive to detecting an operating condition where the tessellation control data is not dependent on the input data of said input list, to combine original tessellation setup code and original tessellation code specified by said application in order to generate said tessellation shader routine.

Viewed from a third aspect, the present invention provides a method of operating a graphics processing unit having a shader execution unit for executing a plurality of shader routines in order to perform a predetermined sequence of shader operations, and a rendering unit for performing at least one rendering operation on data output by the shader execution unit, the method comprising: allocating to the shader execution unit individual shader routines from a set of shader routines, in order to cause the predetermined sequence of shader operations to be performed, the predetermined sequence of shader operations including a tessellation operation, the tessellation operation receiving as inputs tessellation control data and an input list of input data for M input vertices, and generating as outputs at least output data for P output vertices; said allocating step including allocating to the shader execution unit, for each output vertex of the P output vertices, a tessellation shader routine from said set of shader routines; performing within the shader execution unit, each time the tessellation shader routine is executed for an associated output vertex, the steps of: (i) computing, in dependence on the tessellation control data and the associated output vertex, tessellation coordinate data; and (ii) computing from the input data for the M input vertices, and the tessellation coordinate data generated in step (i), the output data for the associated output vertex.

Viewed from a fourth aspect, the present invention provides a graphics processing unit comprising: shader execution means for executing a plurality of shader routines in order to perform a predetermined sequence of shader operations; rendering means for performing at least one rendering operation on data output by the shader execution means;

control means for allocating to the shader execution means individual shader routines from a set of shader routines, in order to cause the predetermined sequence of shader operations to be performed; the predetermined sequence of shader operations including a tessellation operation, the tessellation operation receiving as inputs tessellation control data and an input list of input data for M input vertices, and generating as outputs at least output data for P output vertices; the control means for allocating to the shader execution means, for each output vertex of the P output vertices, a tessellation shader routine from said set of shader routines; the shader execution means, each time the tessellation shader routine is executed for an associated output vertex: (i) for computing, in dependence on the tessellation control data and the associated output vertex, tessellation coordinate data; and (ii) for computing from the input data for the M input vertices, and the tessellation coordinate data generated in step (i), the output data for the associated output vertex.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 2:
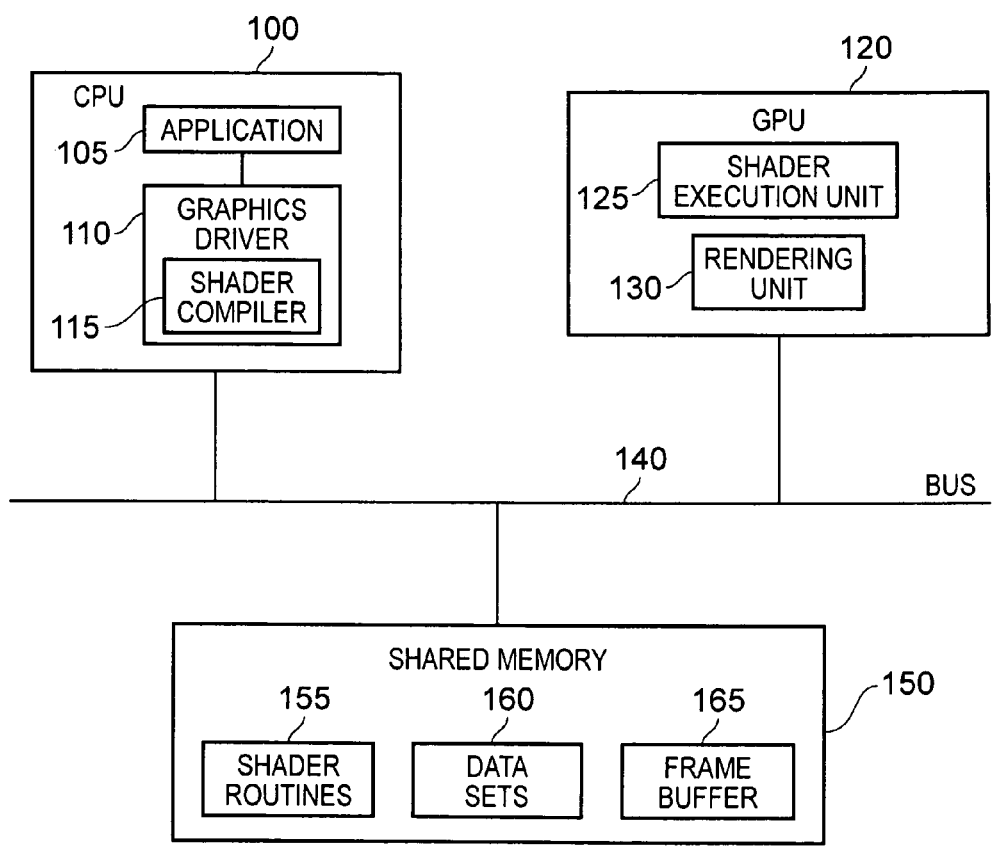
FIG. 2 is a block diagram of a data processing system in accordance with one embodiment.

FIG. 2 is a block diagram schematically illustrating a data processing system in accordance with one embodiment. In particular, a central processing unit (CPU) 100 is coupled via bus structure 140 with a graphics processing unit (GPU) 120 and shared memory 150. A graphics application 105 is executed on the CPU 100, using the graphics driver 110 to control the operation of the GPU 120 to perform the graphics operations required by the application 105.

The GPU 120 includes a number of processing elements, including a shader execution unit 125 and a rendering unit 130. Based on original program code specified by the application 105, a shader compiler 115 within the graphics driver 110 will generate a number of shader routines for execution by the shader execution unit 125, those compiled shader routines 155 being stored within the shared memory 150 from where they can then be accessed by the GPU 120 for execution within the shader execution unit 125.

The application 105 will also typically identify the data to be subjected to graphics processing, and that original data will be stored as one or more sets of data 160 within the shared memory 150, from where it can then be accessed by the GPU 120. As will be understood by those skilled in the art, a shader execution unit will be used to perform a number of data manipulation operations on the originally specified graphics data in order to generate data that is then passed to the rendering unit 130. Any of these intermediate sets of data are also stored as data sets 160 within the shared memory 150.

As will be discussed in more detail herein, one of the operations performed by the shader execution unit is a tessellation operation, with the output of the tessellation operation being a mesh vertex array (also referred to herein as an output list of P vertices) and mesh topology data (also referred to herein as an index list of R index entries). The mesh vertex data and mesh topology data produced by the tessellation operation can then be retrieved by the GPU 120 from the data set memory 160 within the shared memory 150, and input to the rendering unit 130, which performs a number of standard graphics processing operations in order to generate the final graphics images to be displayed, those graphics images being stored within the frame buffer 165.

Figure 3:
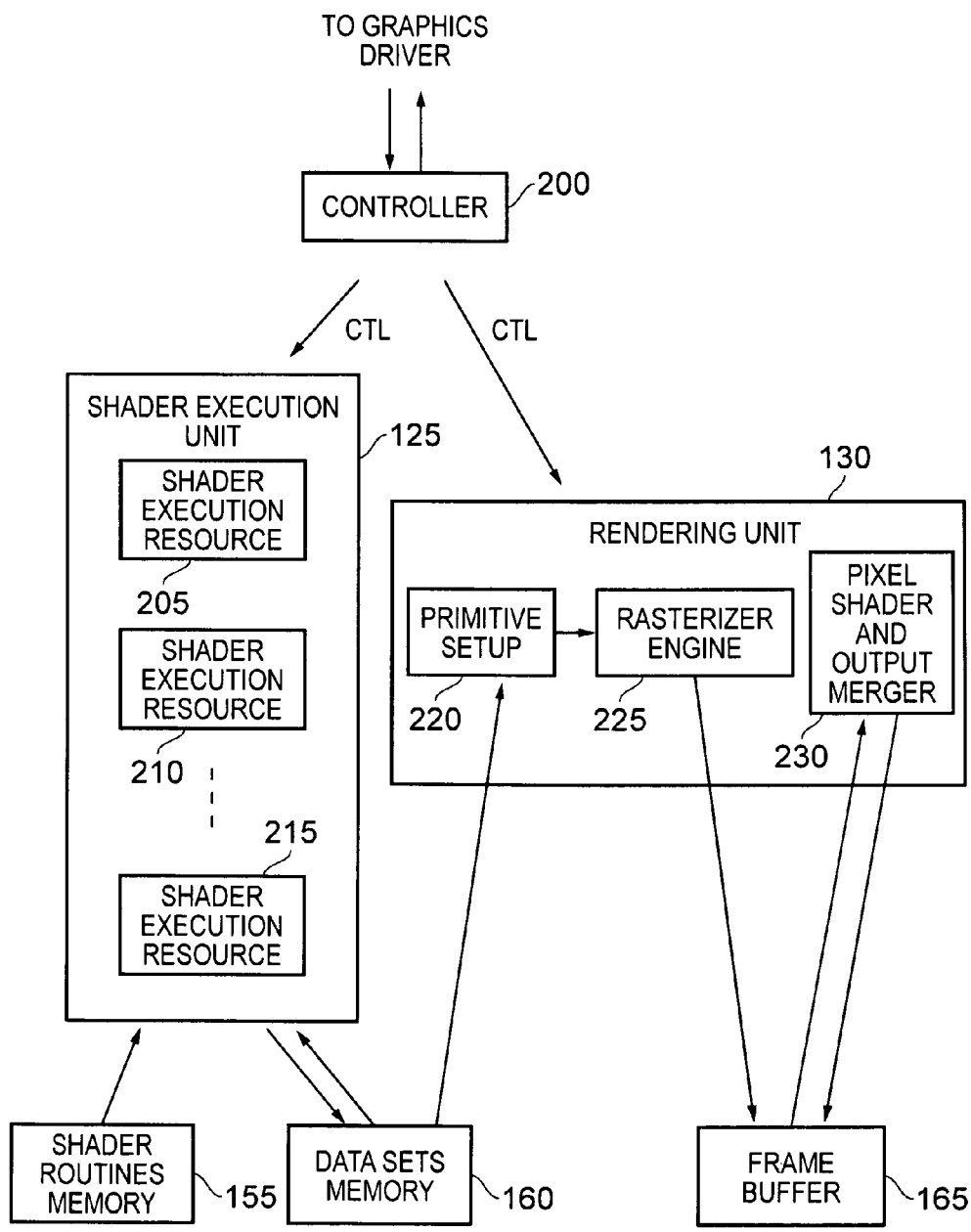
FIG. 3 is a block diagram illustrating components provided within the graphics processing unit of FIG. 2 in accordance with one embodiment.

FIG. 3 illustrates in more detail components provided within the GPU 120 of FIG. 2 in accordance with one embodiment. The shader execution unit 125 and rendering unit 130 are controlled by a controller 200, which communicates via the bus 140 with the graphics driver 110 of the CPU 100. Once the various shader routines have been compiled by the shader compiler 115 and stored within the shader routines memory 155, and some original data has been specified by the application 105 and stored within the data sets memory 160, the graphics driver 110 will send a control signal to the controller 200, to cause the controller to operate a sequence of shader routines within the shader execution unit 125.

The shader execution unit 125 may comprise a single shader execution resource, but in the embodiment shown a plurality of shader execution resources 205, 210, 215 are provided to enable a number of shader routines to be executed at least partly in parallel. In one embodiment, these various shader execution resources may take the form of separate shader engines within the shader execution unit 125, whilst in an alternative embodiment they may take the form of separate shader execution threads provided by the shader execution unit 125. As will be discussed in more detail below, a number of different shader operations may be specified by the application, and accordingly a variety of different shader routines will be executed within the shader execution unit. One of the operations performed by execution of these various shader routines is a tessellation operation generating an output list of P vertices and an index list of R index entries that are then stored within the data sets memory 160 for use by the rendering unit 130. Collectively, the output list and the index list identify as mesh data a mesh of graphics primitives that are to be rendered in order to produce the final graphics image for display.

When this mesh data is available, the controller 200 will send a control signal to the rendering unit 130 to cause it to perform the required rendering operation on that mesh data. The mesh data will then be passed to a primitive setup stage 220 within the rendering unit, which performs some initial manipulation of the mesh data prior to inputting it to the rasterizer engine 225. As will be well understood by those skilled in the art, the rasterizer engine converts the various primitives into pixels, with that data typically being stored in the frame buffer 165.

Potentially, a number of different meshes will be incorporated within a single display frame and the pixel shader part of the pixel shader and output merger block 230 is used to determine the final pixel colour to be used for each pixel, and can also calculate a depth value to be written to the depth buffer. The output merger then merges various types of output data (for example pixel shader values, alpha blending values, depth/stencil values, etc.), in order to produce the final resultant image data for display, that data being returned to the frame buffer 165.

Figure 1:
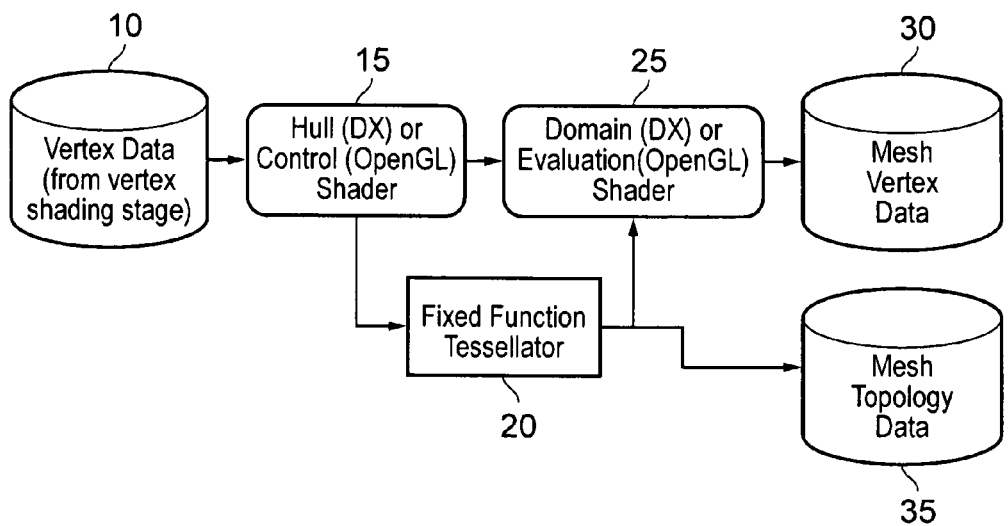
FIG. 1 is a diagram schematically illustrating components used to perform tessellation in accordance with known modern graphics APIs.

In accordance with the above described embodiment, the rendering unit 130 operates in an entirely standard manner. Further, whilst the shader execution unit 125 executes individual shader routines as it would normally do, the shader routines involved in the tessellation operation are modified by the shader compiler 115, enabling the fixed-function tessellator function 20 discussed earlier with reference to FIG. 1 to be incorporated within a supplemented Domain shader routine, as will be discussed in more detail below.

Figure 4:
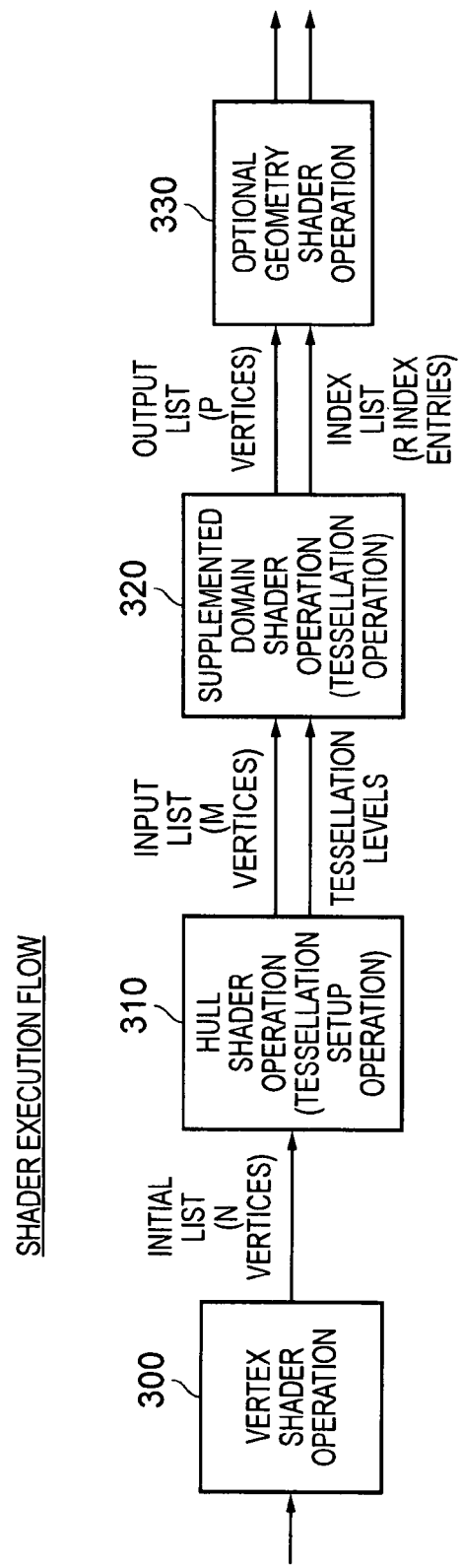
FIG. 4 illustrates a sequence of shader operations performed by the shader execution unit of FIG. 3 in accordance with one embodiment.

FIG. 4 schematically illustrates the sequence of shader operations performed by the shader execution unit 125 in accordance with one embodiment. As shown in FIG. 4, the original vertex data specified by the application 105 is first subjected to a vertex shader operation 300. The vertex shader operation involves executing a vertex shader routine once for each vertex specified in the original data and, as will be understood by those skilled in the art, can perform a variety of operations, such as transformations, skinning or lighting. The output from the vertex shader operation is then an initial list of N vertices which is provided as an input to a Hull shader operation 310 (using DirectX terminology), this Hull shader operation also being referred to herein as a tessellation setup operation.

In one embodiment, the Hull shader operation performed at step 310 operates in the conventional manner, and accordingly specifies a number M of input vertices to be generated and executes a Hull shader routine once for each such input vertex. Each time the Hull shader routine is executed, it uses the initial list of N vertices, and determines both the data to be generated for the particular input vertex in question, and also tessellation level data used to define the domain space. As will be understood by those skilled in the art, while every instance of the Hull shader routine can write tessellation level data, the system decides what values of the tessellation level data are to be provided to the Domain shader operation if they are not consistent. In summary, after the Hull shader routine has been executed for each of the M vertices, there will be a set of tessellation level data produced that is based on the outputs of the Hull shader operation 310. As will also be understood by those skilled in the art, the number of the tessellation level values provided will depend on the type of tessellation domain being used. For example, for an isoline tessellation domain, two tessellation values are typically used, for a quad tessellation domain, six tessellation values are typically used, and for a triangle tessellation domain, four tessellation level values are typically used.

Once the tessellation level data is available, it can be determined how much memory will be required to store the output list and the index list to be generated by the supplemented Domain shader operation 320, and in one embodiment the controller 200 communicates with the graphics driver 110 to cause a memory allocation operation to be performed.

As will be discussed in more detail later with reference to FIG. 5, the input list of M vertices produced by the Hull shader 310 is provided as an input to the supplemented Domain shader operation 320, also referred to herein as the tessellation operation. This tessellation operation also receives as input the tessellation level data produced by the Hull shader operation 310. In addition to performing operations typically associated with a Domain shader (using DirectX terminology), the supplemented Domain shader operation also emulates the operation of the fixed-function tessellator block 20 of FIG. 1, and accordingly generates on the fly the tessellation coordinate data required by the Domain shader in order to generate the output data for each output vertex of the output list. In addition, this tessellation emulation also generates the mesh topology data used to populate the index list.

An optional Geometry shader operation 330 may also be provided, which operates in a conventional manner Accordingly, as will be appreciated by those skilled in the art, the Geometry shader operation may process entire primitives such as triangles, points or lines, and given a particular primitive, the Geometry shader operation may discard it, or generate one or more new primitives. Further, if the data set manipulated by the various shader routines up until this stage is specified in 3D space, the Geometry shader operation may perform 3D to 2D conversion. The output from the optional Geometry shader operation 330 (or the output from the supplemented Domain shader operation 320 in situations where the optional Geometry shader operation is not used) is then stored within the data sets 160 for subsequent access by the rendering unit 130.

Figure 5:
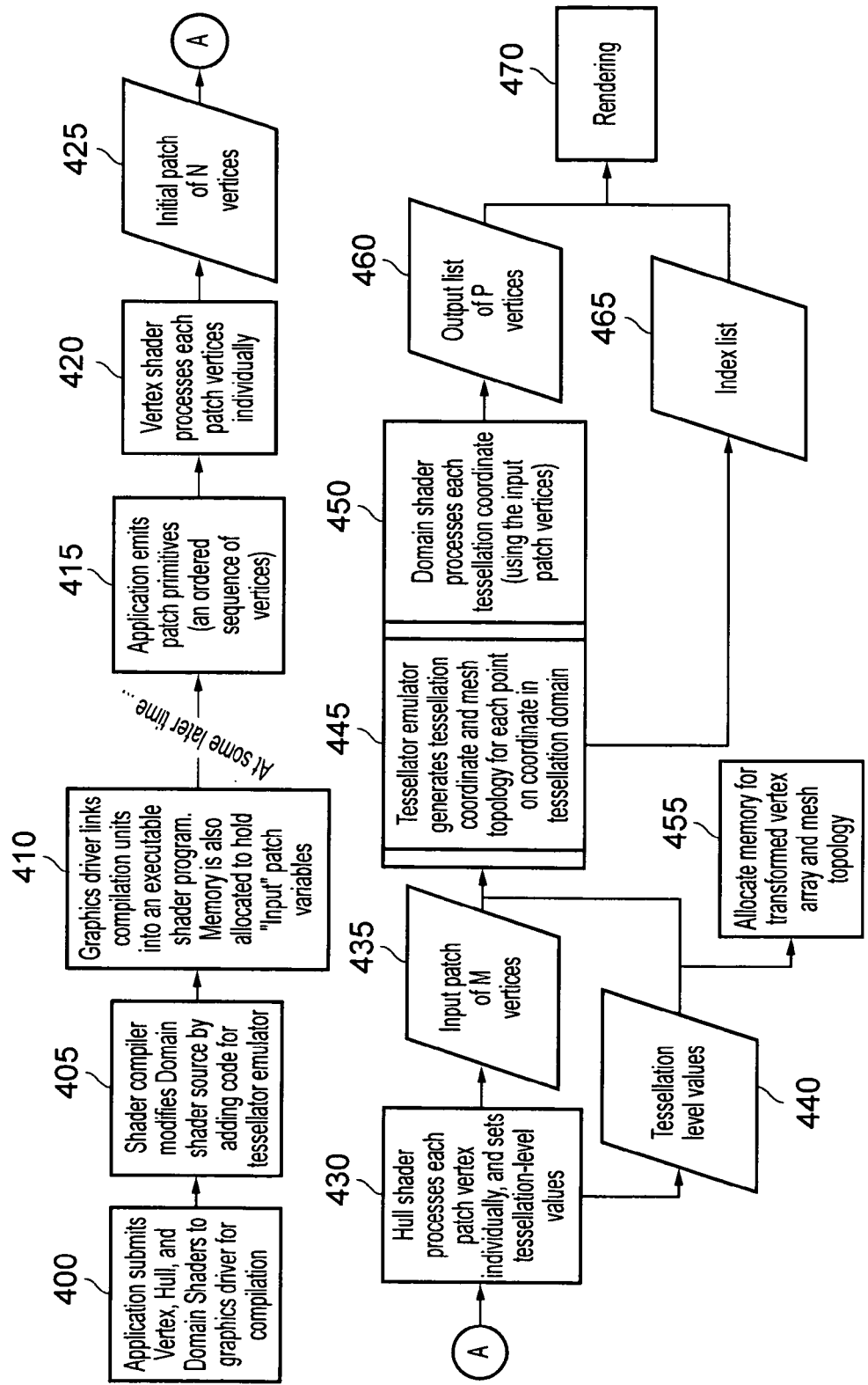
FIG. 5 is a flow diagram illustrating the steps performed by the data processing system of FIG. 2 in order to produce data for use by the rendering unit, in accordance with one embodiment.

FIG. 5 is a flow diagram illustrating the sequence of steps performed by the data processing system of FIG. 2 in accordance with one embodiment in order to produce the mesh data used by the rendering unit 130. At step 400, the application 105 submits Vertex, Hull and Domain shader programs to the graphics driver 110 for compilation by the shader compiler 115. Whilst modern graphics APIs such as DirectX and OpenGL specify the presence of such shaders, they are fully programmable, and accordingly the application 105 provides the relevant shader programs to describe the exact operations to be completed for each shader stage.

At step 405, the shader compiler 115 modifies the Domain shader source code by adding code to perform the tessellator emulator function that will remove the need to use the fixed-function tessellator. The graphics driver 110 then links the various compilation units into an executable shader program at step 410. Also at this stage, the graphics driver will typically allocate memory within the shared memory 150 to hold the input patch variables to be generated in due course by the Hull shader operation.

At some later time, at step 415, the application will emit some original data to be processed by the GPU, this data being referred to herein as patch primitives, and forming an ordered sequence of original vertices.

Up until this point, all of the above described steps 400, 405, 410 and 415 have been performed within the CPU 100. However, following the output of the patch primitives at step 415, a control signal is sent to the GPU 120 to cause the controller 200 to allocate to the shader execution unit 125 a number of instances of the vertex shader routine in order to perform the vertex shader operation 300 described earlier with reference to FIG. 4. As described earlier, each instance of the vertex shader routine will process a single patch vertex individually and after the vertex shader operation has been completed at step 420, it will result in the generation of an initial patch of N vertices 425 (also referred to herein as an initial list of N vertices). In one embodiment, this initial list of N vertices is stored back to the data sets memory 160 of the shared memory 150.

Thereafter, at step 430, the controller 200 within the GPU will allocate a number of instances of the Hull shader routine to the shader execution unit 125 in order to cause the Hull shader operation 310 described earlier with reference to FIG. 4 to be performed. As discussed earlier, the Hull shader processes each patch vertex individually and sets tessellation level values. M iterations of the Hull shader routine will hence be used to generate the resultant input patch of M vertices 435 (also referred to herein as an input list of M vertices), this data in one embodiment being stored back to the data sets memory 160. In addition, the Hull shader will produce at step 430 the tessellation level values 440, and in one embodiment these tessellation level values are also stored back to the data sets memory 160.

Whilst in one embodiment M iterations of the Hull shader routine will be used to generate the resultant input patch of M vertices, the shader compiler may in some embodiments be arranged to recognise situations where a reduced number of iterations is required. For example, in situations where the Hull shader only modifies one or a few vertices, and generates the data for the rest of the M input vertices by merely copying data of corresponding ones of the N initial vertices, the compiler may be able to optimise that situation in order to require only a reduced number of iterations of the Hull shader routine to be performed (or potentially even a single iteration that performs all of the required operations). This may save more work overall than performing M iterations of the Hull shading routine, where most of the iterations perform very little work.

Thereafter, at step 455, the controller 200 within the GPU will indicate to the graphics driver 110 that the tessellation level values have been computed, and the graphics driver 110 will then retrieve that tessellation level value data from the data sets memory 160, and allocate the required memory within the shared memory 150 to store in due course the mesh data to be produced by the supplemented Domain shader operation 320, this mesh data including a transformed vertex array referred to herein as the output list of P vertices, and the mesh topology referred to herein as the index list.

The controller 200 will then allocate to the shader execution unit 125 a number of instances of the supplemented Domain shader routine created by the compiler at step 405, each instance of this supplemented Domain shader routine receiving the input list of M vertices and the tessellation level values. The supplemented Domain shader routine will be executed once for each of the output vertices within the output list to be generated by the Domain shader operation, and accordingly in the example where the output list contains P output vertices, there will be P iterations of the supplemented Domain shader routine executed in order to perform steps 445 and 450.

The tessellator emulator code 445 within the supplemented Domain shader routine generates, from the tessellation level values and the particular output vertex under consideration, tessellation coordinate data which is then used by the Domain shader at step 450 (in combination with the input data for the M input vertices) to generate the data for the corresponding output vertex.

The tessellator emulator also generates at step 445 index data that is used to populate the R index entries of the index list. The amount of index data generated by any particular instance of the supplemented Domain shader routine will depend on the particular output vertex being considered by that instance. For some output vertices, no index data will be generated, whilst for other output vertices several items of index data will be generated. By the time the P iterations of the supplemented Domain shader routine have been executed in order to complete the tessellation emulation and Domain shader operations 445, 450, a fully populated index list will have been produced, the populated index list providing an index entry for each primitive that is incident with each of the P output vertices. Both the output list 460 and the index list 465 will typically then be stored to the data sets memory 160, where they can then subsequently be accessed by the rendering unit 130 in order to perform the various rendering operations at step 470 discussed earlier with reference to FIG. 3.

Figure 6A:
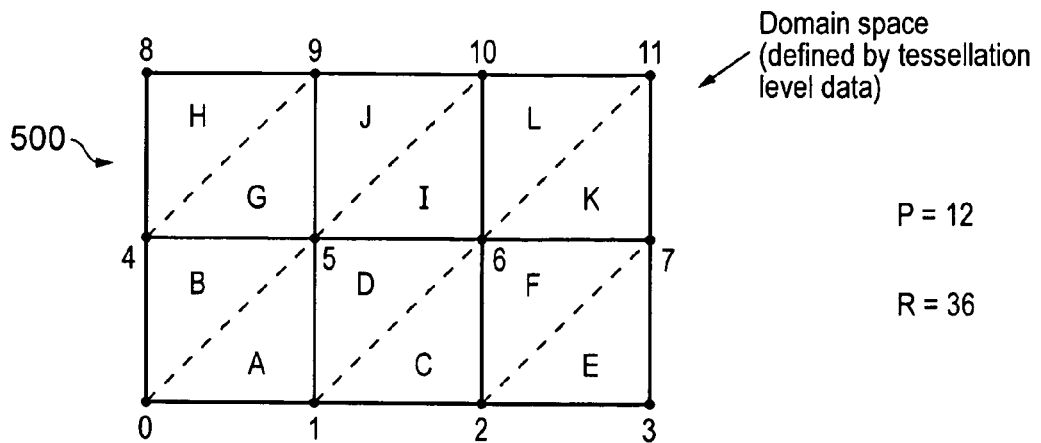
FIGS. 6A to 6C illustrates the processes performed by the steps 445 and 450 of FIG. 5 in accordance with one embodiment.
Figure 6B:
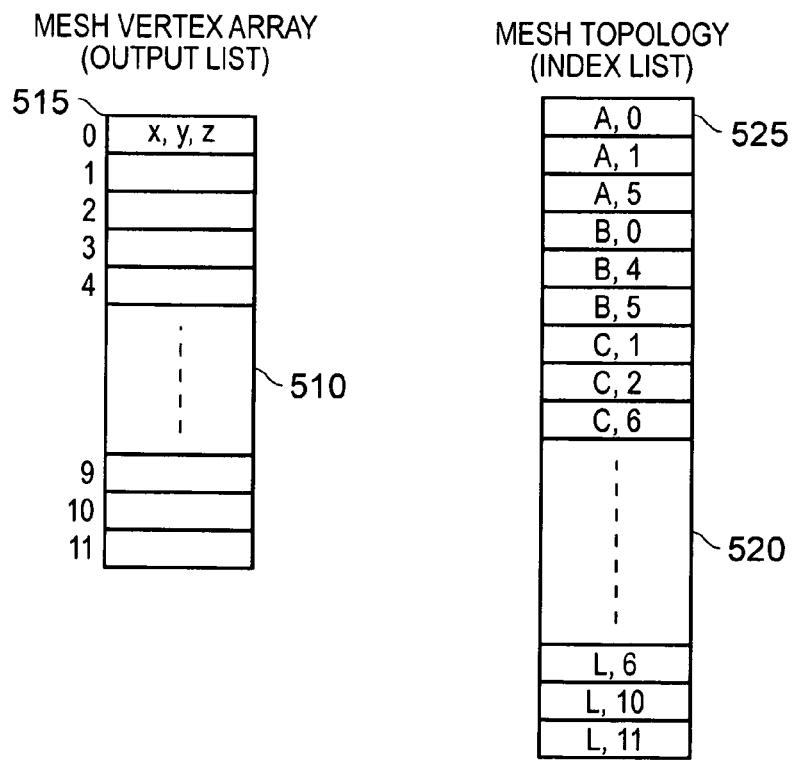

FIG. 6A illustrates the domain space that is defined by the tessellation level values 440 output by the Hull shader. In particular, the tessellator emulator will at step 445 determine from the tessellation level values the form of the domain space. In this example, it determines that there are twelve output vertices arranged in a 4×3 matrix, with twelve triangles A to L being used to tessellate that domain space. Since there are twelve output vertices, then as shown in FIG. 6B the output list 510 generated by the Domain shader at step 450 will contain twelve entries 0 to 11, and within each entry 515 various items of mesh data will be stored, such as coordinate data (in this example x, y and z data), along with various other attributes associated with that vertex, for example colour, etc. Further, since each triangle has three vertices, it will be appreciated that the index list will contain 36 entries, namely three entries for each triangle. The tessellator emulator at step 445 will generate the data required to populate the index list, and that data is schematically illustrated in FIG. 6B. Hence the index list 520 contains a series of entries 525, and each entry identifies both a particular primitive, and one of the vertices of that primitive. The actual data associated with any particular vertex can then be obtained from the output list.

Figure 6C:
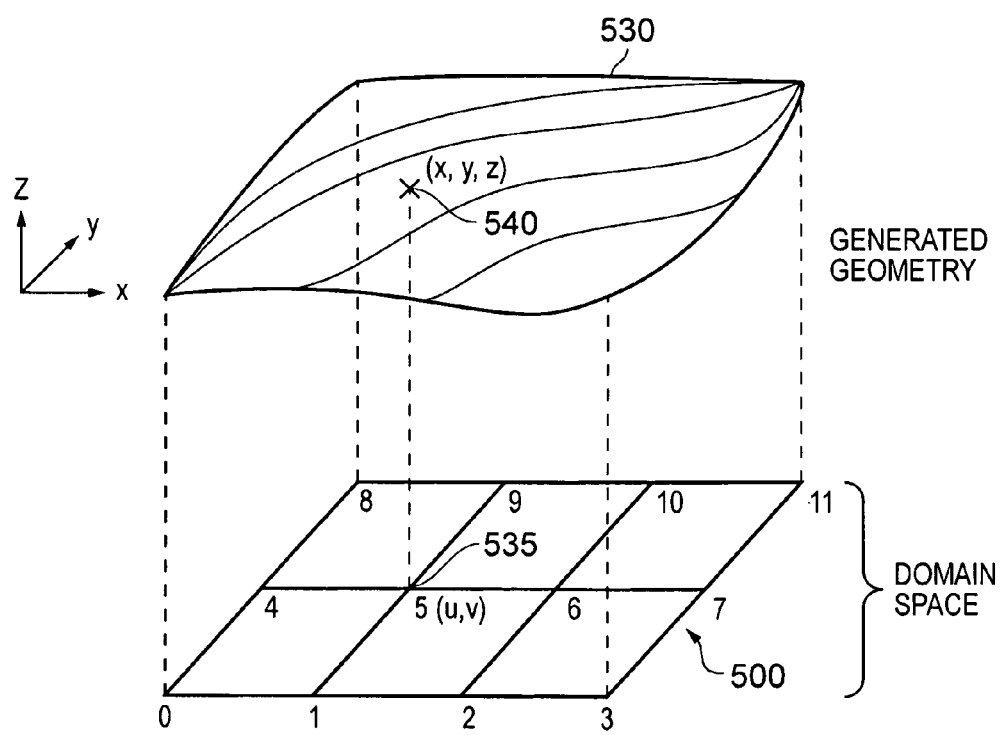

FIG. 6C schematically illustrates how the tessellation coordinate data generated by the tessellator emulator 445 is used by the Domain shader during step 450 in order to generate the output data used to populate the corresponding entry of the output list. In this example, the output vertex 5 is considered. Based on knowledge of the domain space, the tessellator emulator will provide u, v coordinates within the domain space identifying the location 535. Using that coordinate data, and the input patch of M vertices 435 generated by the Hull shader, the Domain shader will then map that coordinate data onto a particular location within the generated geometry 530. In addition to the actual coordinates to be associated with the particular output vertex under consideration, this process will typically also identify various other items of parameter data to be associated with the output vertex. As will be understood by those skilled in the art, such parameter data can take a variety of forms, for example colour data, surface normals (vectors perpendicular to the surface) used for lighting, surface tangents (a vector component of the surface gradient) and surface binormals (a vector produced by taking the cross product of the surface normal and tangent at a point on the surface) used for a technique called bump mapping, texture coordinates (of which there may be a plurality), etc.

From the above discussions, it will be understood that modern graphics APIs include a tessellation phase that most GPUs support using a hardware block. The solution of the embodiment described above identically emulates the hardware operation while minimally increasing the bandwidth of the tessellation operation, and is readily supported in the required graphics APIs. In accordance with the above described embodiment, the operation of the fixed-function tessellator is replaced with two operations, firstly a memory allocation operation for allocating space to store the output mesh vertex and mesh topology data, and secondly an operation performed by an additional piece of shader code that can be incorporated into the Domain shader for generating the data that was previously provided by the fixed-function tessellator. During the analysis phase of the Hull and Domain shader compilation at step 405 of FIG. 5, a small set of additional shader instructions are added to create a supplemented Domain shader routine, these additional shader instructions generating the following data:

a) an index for the current tessellation coordinates;
b) the tessellation coordinates based on the index, which is used in conjunction with the data inputs of the Domain shader in order to generate the mesh vertex's final position; and
c) the set of topological information for the current tessellation coordinate (for example the triangles incident with that vertex).

The run time addition of this code to the Domain shader allows the elimination of the fixed-function portion of the pipeline, and further allows the data-parallel computation of the tessellation coordinates and the mesh topology.

When using the above described approach to obviate the need for the fixed-function tessellator block, it has also been found that under certain situations (specifically, if the tessellation level values of the Hull shader are detectably constant), the Hull and Domain shader stages can be combined into a single shader stage, whilst still generating data that is identical to that produced by the use of separate Hull and Domain shaders.

Figure 7:
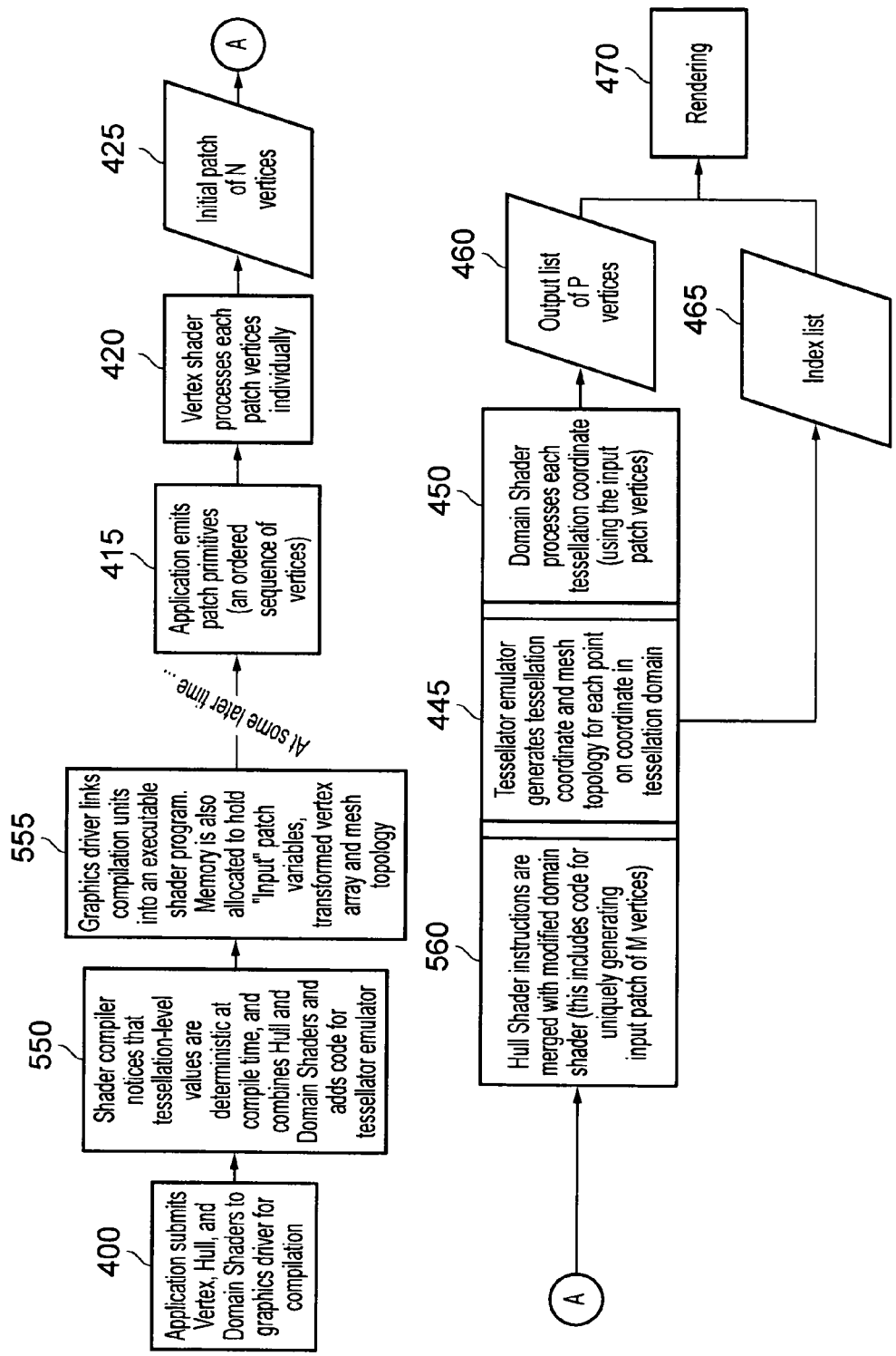
FIG. 7 is a flow diagram illustrating the steps performed by the data processing system of FIG. 2 in order to produce data for use by the rendering unit, in accordance with an alternative embodiment.

FIG. 7 illustrates the sequence of steps performed by the system of FIG. 2 in such situations. Those steps that are identical with the corresponding steps in FIG. 5 have been identified with the same reference numerals. Hence, step 400 is identical to step 400 of FIG. 5, and accordingly will not be discussed further herein. However, following step 400, at step 550, the shader compiler 115 determines that the tessellation level values are deterministic at compile time. In particular, the shader compiler determines that the tessellation levels are constant, and hence when the application presents the Hull shader program to the graphic API's compiler, the compiler knows at that point that the tessellation levels will be constant for all executions of the Hull shader for a particular patch (which is the granularity that tessellation levels can change). Accordingly, in this case it is determined that the Hull shader does not need to output the tessellation levels at all. Accordingly, the shader compiler combines the Hull and Domain shaders, and in addition adds the required code for the tessellator emulation as discussed earlier with reference to step 405 of FIG. 5.

Thereafter, at step 555, the graphics driver links the compilation units into an executable shader program and memory is allocated to hold the input patch variables, in the same way as discussed earlier for step 410 of FIG. 5. However, in addition, memory is also allocated at this stage to hold the transformed vertex array (i.e. the output list 460) to be generated by the Domain shader at step 450, and the mesh topology (i.e. the index list 465) to be generated by the tessellator emulator at step 445, since the memory required for these outputs is deterministic at compile time given the determination that the tessellation levels are constant.

Steps 415, 420 and 425 are identical to the corresponding steps in FIG. 5, and accordingly will not be discussed further herein. Following step 425, the operation of the Hull shader is performed by instructions that have been merged into the modified Domain shader, this process taking place at step 560, and resulting in the generation of the input patch of M vertices. The tessellator emulator operates at step 445 in the same way as described earlier with reference to FIG. 5, receiving the input patch of M vertices and the constant tessellation level values. The Domain shader also operates at step 450 in the same way as described earlier with reference to FIG. 5, and accordingly following the tessellation emulation operation 445 and the Domain shader operation 450, the output list of P vertices 460 and the index list 465 are generated and stored within the data sets memory 160 for subsequent access by the rendering unit 130 when performing the rendering operations at step 470.

In accordance with this embodiment, each instance of the enhanced Domain shader routine allocated to the shader execution unit 125 will perform parts of steps 560, 445 and 450. Whilst such an approach does cause repetition of the Hull shader operation (in particular the Hull shader operation being repeated at step 560 each time the enhanced Domain shader routine is executed), it significantly reduces the bandwidth required for access to shared memory, since the input patch of M vertices that would typically be stored back to the data sets memory 160 when produced by the Hull shader is no longer stored to memory, but instead is directly consumed by the enhanced Domain shader routine during the performance of steps 445 and 450. By avoiding the need to store such intermediate results, this can lead to significantly improved performance. Furthermore, the controller 200 only needs to allocate a single shader routine to the shader execution unit instead of two separate shader routines to perform the Hull and Domain shading operations. In addition, as discussed with reference to step 555, such an approach allows the graphics driver to pre-allocate the memory for storing the mesh data results (potentially as early as shader compilation time). As a result, in situations where the tessellation level data is not dependent on the input data, such an approach is likely to result in an overall gain in both application performance and bandwidth reduction.

Irrespective of whether the approach of FIG. 5 or the approach of FIG. 7 is taken, it will be appreciated that the amount of memory available for use in the rendering operation at step 470 needs to be sufficient to hold both the output list of P vertices 460 and the R index entries of the index list 465. However, in situations where it is determined that the memory space required to hold both the output list of P vertices 460 and the R index entries of the index list 465 may exceed the maximum amount of memory available for use in the rendering operation, the execution mode illustrated by the flow diagram of FIG. 8 can instead be used to implement steps 445 and 450 of FIG. 5 or 7.

In particular, once the input patch of M vertices and the tessellation level values have been computed, the controller determines at step 600 the value P, i.e. the number of output vertices to be contained within the output list 460. Thereafter, the process proceeds to step 605, where the variable i is set equal to 0. Thereafter, at step 610, it is determined whether i is equal to the value P, and if not the process proceeds to step 615.

For the purposes of the described embodiment, it is assumed that a triangle mechanism is to be used to tessellate the domain space, as for example discussed earlier with reference to FIG. 6A. Accordingly, at step 615 execution of the supplemented domain shader routine is initiated for the index i, but also the other two indices that would generate a triangle in the mesh are computed. Hence, considering the earlier example of FIG. 6A, if the index i is 0, the other indices 1 and 5 will be determined at this point, in order to identify the triangle A.

For each identified index at step 615, the associated tessellation coordinate data is determined at step 620 using the tessellator emulator function of the supplemented domain shader routine. Thereafter, at step 625, the domain shader routine generates the output data for the three output vertices based on the associated tessellation coordinate data for each output vertex and the input patch of M vertices.

At this point, the output data for the three output vertices is then output for rendering at step 470, by issuing at step 630 a single triangle draw call taking as inputs the data for the three output vertices generated at step 625. Thereafter, the value of i is incremented by one at step 635, whereafter the process returns to step 610. When it is subsequently determined that the value of i is now equal to P, the process branches to step 640, where the tessellation process is considered to be complete.

Figure 8:
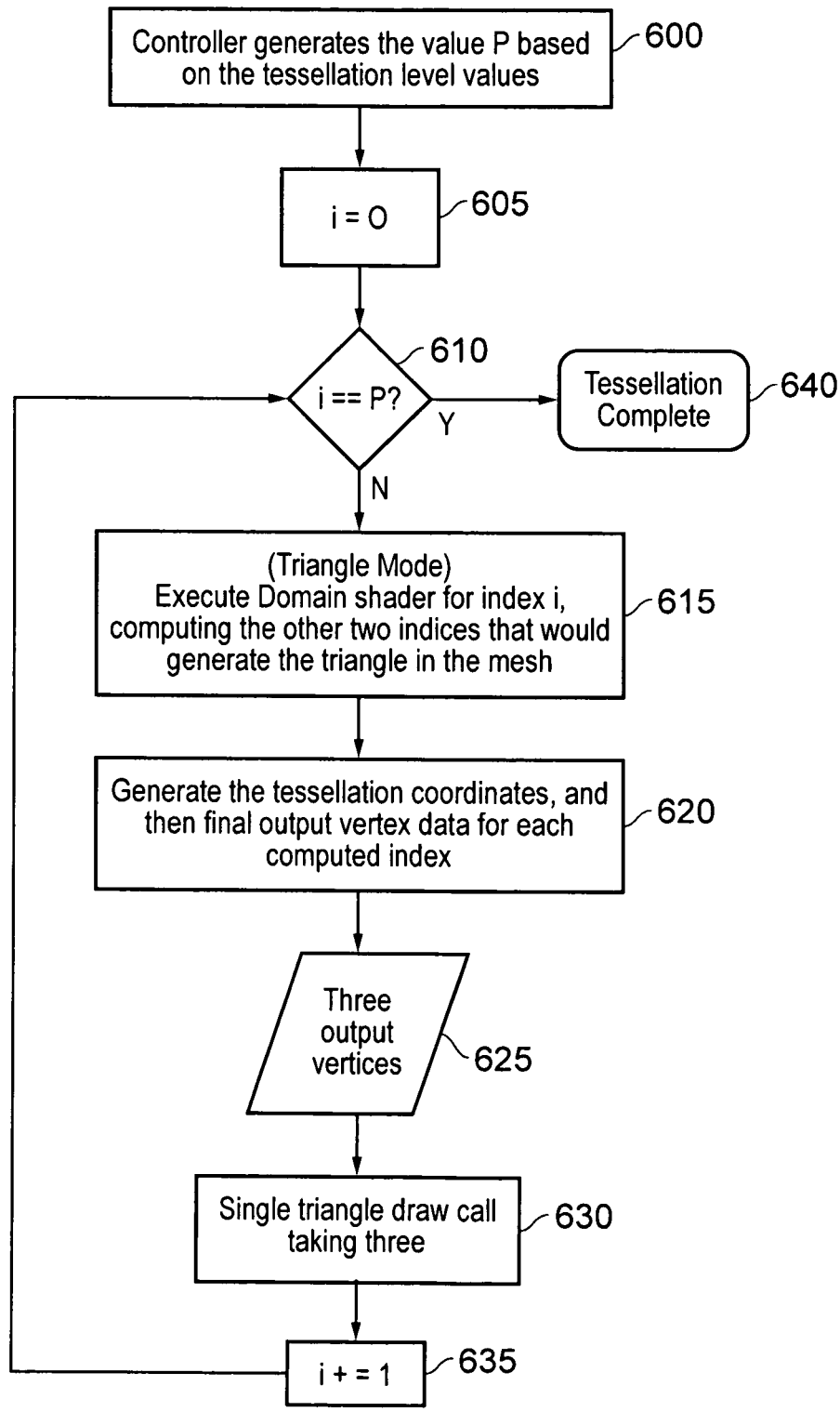
FIG. 8 is a flow diagram illustrating an alternative embodiment that can be used to implement the functionality of steps 445 and 450 of FIG. 5 or 7 when memory space is limited.

Through use of the above mechanism illustrated in FIG. 8, the benefits of the techniques of the earlier described embodiments can still be realised, but with significantly reduced memory requirements. In particular, the supplemented domain shader routine (including tessellation emulation) is used for each unique index individually, so as to generate a single geometric primitives at a time (i.e. a line segment between two tessellation coordinates for isolines, or a triangle between three tessellation coordinates for quads and triangles), and without requiring any additional memory storage other than that required for storing the output vertex data for the two or three vertices of that geometric primitive. No storage is required for storing an index list 465, since that data does not need to be generated in accordance with this revised approach.

Whilst in the above described embodiments the graphics processing unit has been described as a dedicated component separate to the general-purpose central processing unit, in alternative embodiments some or all of the functionality of the described graphics processing unit may be performed by processing resources within the central processing unit. For example, the various shader routines generated by the shader compiler 115 within the graphics driver 110 could be generated as instruction sequences to be executed by the CPU rather than by a separate graphics processing unit, and hence at least the earlier-described operations of the shader execution unit and associated controller could be implemented by components of the CPU in such embodiments. Any or all parts of the described algorithm could be performed on the central processing unit without affecting the operation of the application 105.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A graphics processing appartus comprising:
    shader execution circuitry configured to execute a plurality of shader routines in order to perform a predetermined sequence of shader operations;
    rendering circuitry configured to perform at least one rendering operation on data output by the shader execution circuitry;
    control circuitry configured to allocate to the shader execution circuitry individual shader routines from a set of shader routines, in order to cause the predetermined sequence of shader operations to be performed;
    the predetermined sequence of shader operations including a tessellation setup operation, the tessellation setup operation receiving as an input an initial list of initial data for N initial vertices, and generating as output an input list of input data for M input vertices and tessellation control data;
    the predetermined sequence of shader operations further including a tessellation operation, the tessellation operation receiving as inputs said tessellation control data and said input list of input data for M input vertices, and generating at least output data for P output vertices;
    the control circuitry is configured to cause the tessellation operation to be performed by allocating to the shader execution circuitry, for each output vertex of the P output vertices, a tessellation shader routine from said set of shader routines;
    the shader execution circuitry configured, each time the tessellation shader routine is executed for an associated output vertex, to:
    (i) compute, in dependence on the tessellation control data and the associated output vertex, tessellation coordinate data; and to
    (ii) compute from the input data for the M input vertices, and the tessellation coordinate data, the output data for the associated output vertex.

2. A graphics processing apparatus as claimed in claim 1, wherein the tessellation operation is configured to generate as outputs an output list of the output data for the P output vertices, and an index list having R index entries containing index data used to control how the output data for each of the P output vertices is subsequently used by the rendering circuitry, the shader execution circuitry being configured, each time the tessellation shader routine is executed for an associated output vertex, in addition to said step (i) and (ii):
    (iii) to generate, in dependence on the associated output vertex, index data used to populate the R index entries of said index list.

3. A graphics processing apparatus as claimed in claim 1, wherein:
    the shader execution circuitry has a plurality of shader execution resources, each shader execution resource configured to execute an allocated shader routine; and
    the controller is configured to allocate the tessellation shader routine to multiple of said shader execution resources to cause the tessellation operation for multiple output vertices of the P output vertices to be performed at least partially in parallel.

4. A graphics processing apparatus as claimed in claim 2, wherein said tessellation control data identifies the number P of output vertices, and the number R of index entries in said index list.

5. A graphics processing apparatus as claimed in claim 2, wherein said set of shader routines are generated by a shader compiler provided by a graphics driver within an additional processing circuitry with which the graphics processing circuitry is coupled, the shader compiler modifying original tessellation code specified by an application executing on the additional processing circuitry in order to supplement the tessellation shader routine generated for that original tessellation code with functions to perform said steps (i) and (iii) in addition to said step (ii) specified by the original tessellation code.

6. A graphics processing apparatus as claimed in claim 2, wherein each index entry in the index list is populated with associated index data by the time execution of the tessellation shader routine for every output vertex of the output list has been completed, the populated index list providing an index entry for each primitive that is incident with each of the P output vertices.

7. A graphics processing apparatus as claimed in claim 2, wherein said tessellation shader routine is a Domain shader routine supplemented with tessellation functions to perform said steps (i) and (iii) in addition to the Domain shader function of said step (ii).

8. A data processing apparatus comprising a graphics driver for executing a shader compiler to generate a set of shader routines for execution by the graphics processing apparatus as claimed in claim 2, the shader compiler being configured to modify original tessellation code specified by an application executing on the data processing apparatus in order to supplement the tessellation shader routine generated for that original tessellation code to include functions to perform said steps (i) and (iii) in addition to said step (ii) specified by the original tessellation code.

9. A data processing apparatus as claimed in claim 8, wherein the shader compiler is responsive to detecting an operating condition where the tessellation control data is not dependent on the input data of said input list, to combine original tessellation setup code and original tessellation code specified by said application in order to generate said tessellation shader routine.

10. A graphics processing apparatus as claimed in claim 1, wherein:
the controller is configured to allocate to the shader execution circuitry, for each input vertex of the M input vertices, a tessellation setup shader routine from said set of shader routines;
the shader execution circuitry being configured, each time the tessellation setup shader routine is executed for an associated input vertex:
a) to compute, from the initial data of the N initial vertices, the input data for the associated input vertex; and
b) to generate data used to form said tessellation control data.

11. A graphics processing apparatus as claimed in claim 10 wherein said tessellation setup shader routine is a Hull shader routine.

12. A graphics processing apparatus as claimed in claim 1, wherein:
said tessellation control data identifies the number P of output vertices in an output list generated by the tessellation operation, and a number R of index entries in an index list generated by the tessellation operation containing index data used to control how the output data for each of the P output vertices is subsequently used by the rendering circuitry; and
the controller is responsive to completion of the tessellation setup operation to issue a notification to a memory allocation means to cause memory space to be allocated for storage of said output list and said index list to be generated by said tessellation operation.

13. A graphics processing apparatus as claimed in claim 12, wherein said memory allocation means is provided by a graphics driver within an additional processing circuitry with which the graphics processing circuitry is coupled, and said memory space resides in shared memory accessible by both the graphics processing circuitry and the additional processing circuitry.

14. A graphics processing apparatus as claimed in claim 1, wherein in an operating condition where the tessellation control data is not dependent on the input data of said input list, the shader execution circuitry is configured, each time the tessellation shader routine is allocated by the controller, to perform an initial step, prior to step (i), of performing a vertex transformation operation on an initial list of initial data for N initial vertices to generate at least a portion of said input list of input data for said M input vertices.

15. A graphics processing apparatus as claimed in claim 14, wherein:
said set of shader routines are generated by a shader compiler provided by a graphics driver within an additional processing circuitry with which the graphics processing circuitry is coupled; and
the shader compiler is responsive to detecting said operating condition to combine original tessellation setup code and original tessellation code specified by an application executing on the additional processing circuitry in order to generate said tessellation shader routine.

16. A graphics processing apparatus as claimed in claim 15, wherein the tessellation operation is configured to generate as outputs an output list of the output data for the P output vertices, and an index list having R index entries containing index data used to control how the output data for each of the P output vertices is subsequently used by the rendering circuitry, the shader execution circuitry being configured, each time the tessellation shader routine is executed for an associated output vertex, in addition to said step (i) and (ii):
(iii) to generate, in dependence on the associated output vertex, index data used to populate the R index entries of said index list; and
the shader compiler is further configured to supplement the tessellation shader routine with functions to perform said steps (i) and (iii) in addition to said step (ii) specified by the original tessellation code.

17. A graphics processing apparatus as claimed in claim 16, wherein said graphics driver is configured to determine the tessellation control data and to allocate, in dependence on the determined tessellation control data, memory space for storage of said output list and said index list to be generated by said tessellation operation.

18. A graphics processing apparatus as claimed in claim 1, wherein:
the tessellation setup operation is a Hull shader operation, and the tessellation operation is a supplemented Domain shader operation incorporating a tessellation emulation operation; and
the tessellation shader routine incorporates a tessellation emulator to perform the computation of the tessellation coordinate data for the associated output vertex.

19. A method of operating a graphics processing apparatus having shader execution circuitry configured to execute a plurality of shader routines in order to perform a predetermined sequence of shader operations, and rendering circuitry configured to perform at least one rendering operation on data output by the shader execution circuitry, the method comprising:
allocating to the shader execution circuitry individual shader routines from a set of shader routines, in order to cause the predetermined sequence of shader operations to be performed, the predetermined sequence of shader operation including a tessellation setup operation, the tessellation setup operation receiving as an input an initial list of initial data for N initial vertices, and generating as outputs an input list of input data for M input vertices and tessellation control data, the predetermined sequence of shader operations further including a tessellation operation, the tessellation operation receiving as inputs said tessellation control data and said input list of input data for M input vertices, and generating at least output data for P output vertices;

said allocating step including allocating to the shader execution circuitry, for each output vertex of the P output vertices, a tessellation shader routine from said set of shader routines, in order to cause the tessellation operation to be performed;

performing within the shader execution circuitry, each time the tessellation shader routine is executed for an associated output vertex, the steps of:

(i) computing, in dependence on the tessellation control data and the associated output vertex, tessellation coordinate data; and (ii) computing from the input data for the M input vertices, and the tessellation coordinate data generated in step (i), the output data for the associated output vertex.

20. A graphics processing apparatus comprising:

means for executing a plurality of shader routines in order to perform a predetermined sequence of shader operations;

means for performing at least one rendering operation on data output by the means for executing a plurality of shader routines;

means for allocating to the means for executing a plurality of shader routines individual shader routines from a set of shader routines, in order to cause the predetermined sequence of shader operations to be performed;

the predetermined sequence of shader operations including a tessellation setup operation, the tessellation setup operation receiving as an input an initial list of initial data for N initial vertices, and generating as outputs an input list of input data for M input vertices and tessellation control data;

the predetermined sequence of shader operations further including a tessellation operation, the tessellation operation receiving as inputs said tessellation control data and said input list of input data for M input vertices, and generating as outputs at least output data for P outpute vertices;

means for causing the tessellation operation to be performed by allocating to the means for executing a plurality of shader routines, for each output vertex of the P output vertices, a tessellation shader routine from said set of shader routines; and the means for executing a plurality of shader routines, each time the tessellation shader routine is executed for an associated output vertex, for:

(i) computing, in dependence on the tessellation control data and the associated output vertex, tessellation coordinate data; and (ii) computing from the input data for the M input vertices, and the tessellation coordinate data generated in step (i), the output data for the associated output vertex.

* * * * *